United States Patent [19]

Mason et al.

[11] Patent Number: 5,063,319

[45] Date of Patent: Nov. 5, 1991

[54] UNIVERSAL MOTOR WITH SECONDARY WINDING WOUND WITH THE RUN FIELD WINDING

[75] Inventors: John G. Mason, Rising Sun; John W. Miller, Parkton; William D. Sauerwein, Phoenix; Stephen L. Vick, Reisterstown, all of Md.

[73] Assignee: Black & Decker, Inc., Newark, Del.

[21] Appl. No.: 351,995

[22] Filed: May 15, 1989

[51] Int. Cl.$^5$ .................. H02K 3/16; H02K 11/00; H02P 3/00; H02P 3/06

[52] U.S. Cl. .................. 310/210; 310/50; 310/68 R; 310/71; 310/68 A; 310/158; 310/184; 318/362; 318/375

[58] Field of Search ............... 29/596; 310/50, 68 R, 310/68 A, 71, 134, 135, 158, 180, 183, 184, 179, 210, 254; 318/362, 370, 373, 375, 381

[56] References Cited

U.S. PATENT DOCUMENTS

| Re. 28,831 | 5/1976 | Brown .................. | 310/194 |
|---|---|---|---|
| 792,103 | 6/1905 | Winter et al. ........... | 318/375 |
| 1,027,048 | 5/1912 | Hawkins . | |
| 1,479,463 | 1/1924 | Entz .................. | 318/381 |
| 2,458,904 | 1/1949 | Happe .................. | 171/252 |
| 2,507,918 | 5/1950 | Mageoch .................. | 318/275 |
| 2,923,873 | 2/1960 | Annis .................. | 310/184 |
| 3,107,321 | 10/1963 | Osawa .................. | 318/244 |
| 3,113,254 | 12/1963 | Kushigemachi et al. ........... | 318/379 |
| 3,725,707 | 4/1973 | Leimbach et al. ........... | 310/71 |
| 3,851,233 | 11/1974 | Sherman .................. | 318/375 |
| 4,056,749 | 11/1977 | Carlson .................. | 310/239 |
| 4,322,647 | 3/1982 | Neroda et al. ........... | 310/71 |
| 4,340,829 | 7/1982 | McCoy .................. | 310/71 |
| 4,370,579 | 1/1983 | Kobayashi et al. ........... | 310/50 |
| 4,481,435 | 11/1984 | Loforese .................. | 310/71 |
| 4,569,125 | 2/1986 | Antl et al. ........... | 310/71 |
| 4,612,702 | 9/1986 | Wheeler .................. | 29/596 |
| 4,613,781 | 9/1986 | Sanders .................. | 310/239 |
| 4,751,414 | 6/1988 | Davis .................. | 310/93 |
| 4,765,054 | 8/1988 | Sauerwein et al. ........... | 310/71 |

FOREIGN PATENT DOCUMENTS

| 55-82097 | 6/1980 | Japan . |
| 59-28297 | 2/1984 | Japan . |
| 2166008 | 5/1987 | United Kingdom . |

OTHER PUBLICATIONS

Bodine Small Motor, Gear Motor and Control Handbook, p. 97.

Braymer and Roe, "Rewinding Small Motors" 1983, p. 300.

Black & Decker Parts Catalog, Bull. 9500-2 "Super Sawcat "1983.

*Primary Examiner*—Steven L. Stephan
*Assistant Examiner*—C. LaBalle
*Attorney, Agent, or Firm*—Dennis A. Dearing; Charles E Yocum; John D. Del Ponti

[57] ABSTRACT

In a 2 pole universal motor for a circular saw a secondary winding provides dynamic braking. Both run and brake windings are split electrically with respect to the armature. All windings are double-ended and wiring and winding is arranged so that all windings may be terminated directly to fixed termination points, four at each end of the stator, providing for axially oriented plug-in connection of brushes at the commutator end and switch and line at the fan end. There are no jumpers within the stator.

31 Claims, 4 Drawing Sheets

UNIVERSAL MOTOR WITH SECONDARY WINDING WOUND WITH THE RUN FIELD WINDING

BACKGROUND OF THE INVENTION

The invention concerns wiring and winding configurations for electric motors and particularly arrangements for small series wound or universal motors of the type typically used in power tools and appliances.

Compactness and low manufacturing costs are generally desirable goals in electric motor design and especially in motors for the highly competitive portable power tool and appliance markets. There, production quantities are often large enough to make automated assembly feasible and advantageous. However, conventional coil winding configurations and termination arrangements still require significant amounts of hand work which inhibit full automation. This residual hand work may include fishing through or threading through of jumper wires or leads from end-to-end or side-to-side of the fields and making their connections, as well as hand insertion of the field coils themselves.

Further, in more complex motors having secondary or auxiliary windings providing an auxiliary function such as dynamic braking, speed change, or reversing the number of connections required to be made to field coil terminations is multiplied and, given the limited amount of space available at the end of the field, it becomes less feasible to provide sufficient space between the terminals to facilitate automated connection.

Electro-dynamic braking systems (taken as an exemplary auxiliary function), with or without specific windings, in small portable tools and appliances are already known. In some tools, such as circular saws, normal unbraked stopping time may be inconveniently long due to the inertia of the motor armature and functional elements such as the circular saw blade. In typical self-excited dynamic braking systems, release of an "on" switch or trigger simultaneously or sequentially interrupts the flow of electrical power to the tool and effects a reverse of polarity in the windings so that, with the aid of the residual magnetic field in the stator, a self-excited electromagnetic field of force is generated, opposing continued rotation of the motor armature in the original running direction, so that rotation is arrested more quickly than by normal windage and friction.

Available conventional dynamic braking systems, with or without a secondary winding, suffer from some shortcomings. In a known circular saw application for example, braking is effected simply, using suitable switching, by reversing the polarity of the saw motor's run winding. But this may result in undesirably rapid deceleration and also high currents and severe arcing, shortening brush, commutator and motor life.

When a secondary winding is provided, specifically for the braking function, winding design may be chosen to moderate the braking action to suit the particular application. However, in known applications especially when the brake field coils are wound opposite hand to the run field coils, the arrangement becomes bulky, making in situ winding less practical and typically requiring relatively costly hand insertion of coils and more complex field connections.

SUMMARY OF THE INVENTION

Accordingly it is an object of the invention to provide a wiring and winding arrangement for a series wound or universal motor having a secondary or auxiliary winding for an auxiliary function, in which field coil winding and termination arrangements and provision for external connection of the field are such that motor assembly is simplified and automation of motor assembly facilitated and with which selected motor operating characteristics are attainable.

This object is realized in part in a stator assembly which includes a plurality of "double ended fields". Each winding has respective start and finish ends adjacent the axially opposite ends of the stator. This inherently distributes terminations of the field coil windings at both ends of the stator, instead of one as is conventional, making greater space available around each termination and facilitating the application of automated assembly equipment.

A further object of the invention is to devise a multiple winding arrangement for a motor circuit, including a secondary winding, such as a brake winding, comprising a combination of double-ended field coils so wound and connected that simplification and facilitation of automated assembly is maintained while providing acceptable performance both in the primary functions of motor running and in an auxiliary or secondary function such as braking.

This second object is achieved in part, in a series wound motor, through the use of split windings (windings which include portions electrically on both sides of the armature), so wound in terms of direction and so interconnected that desired function is achieved without internal connections of the stator and not requiring, for example, jumper leads or wires from end-to-end or side-to-side of the field. And also requiring only simple switching between the run mode and the secondary mode such as braking.

In a preferred embodiment in which the secondary mode is braking, both run and brake windings are split with respect to armature connections. All windings are wound in the same direction as seen by the armature, preferably in situ and automatically and with mechanical termination, and all windings start at the commutator end of the stator. In a two-pole motor with run and brake windings on each pole, this arrangement may provide four terminations for external connection of the field at each end of the stator or field. At the commutator end four terminations are conveniently connectable in pairs directly to a pair of commutator brushes while at the opposite end of the stator (conventionally fan end), four terminations are connectable directly to power supply and switching arrangements.

Other aspects of the invention will become apparent from the description and claims which follow.

DESCRIPTION OF THE PREFERRED EMBODIMENTS

Figure 1:
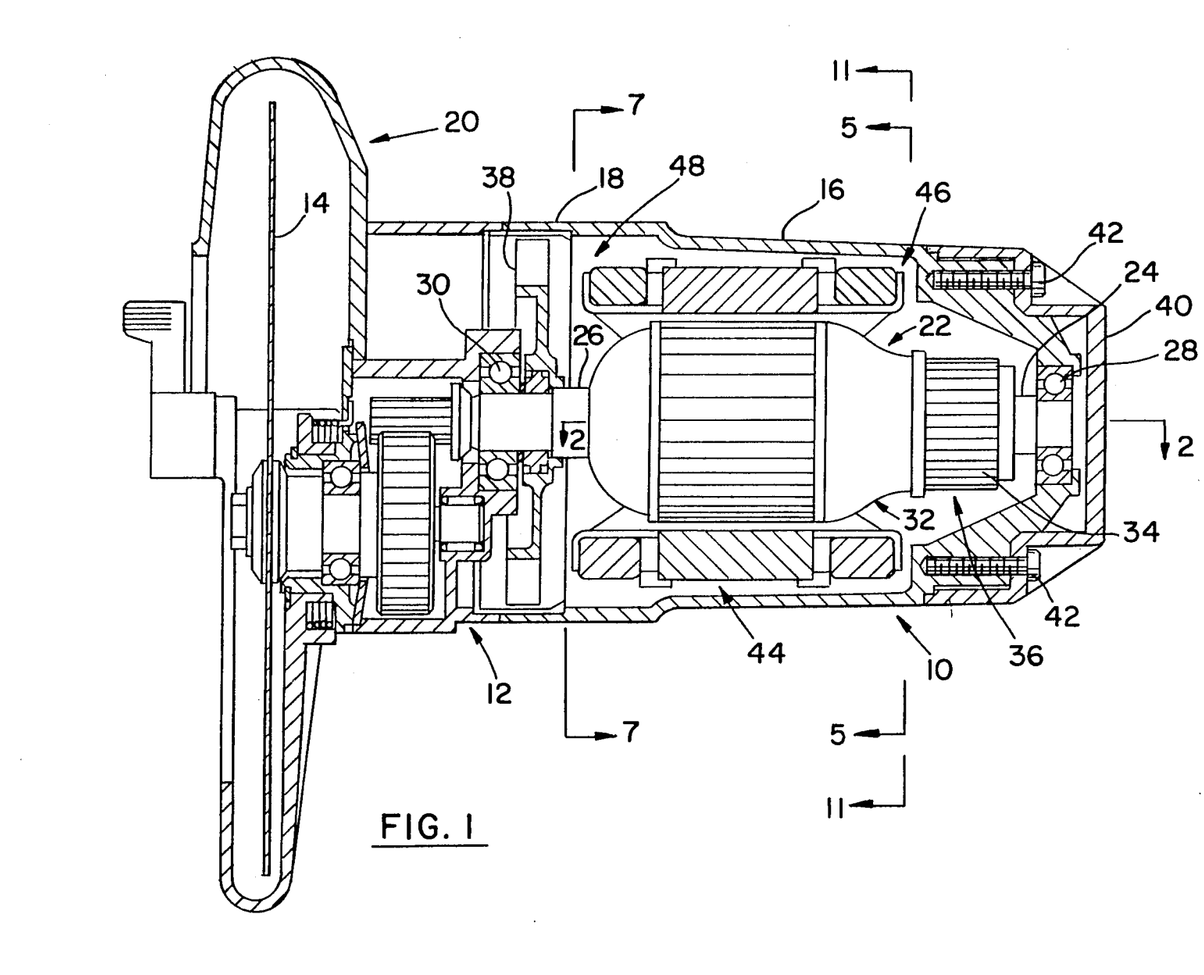
FIG. 1 is a partial cross sectional front view of a portable circular saw embodying the invention, taken on a vertical plane through the axis of the saw motor and transmission.

The invention is embodied in a portable hand-held circular saw of overall generally conventional configuration, principal functional components of which are shown in somewhat simplified form in FIG. 1. These components include the saw motor 10, transmission 12 and saw blade 14. Motor 10 and transmission 12 are housed respectively in a field case 16 and a transmission housing 18. The blade is shielded by shield members 20.

An armature 22 is rotatably supported by shaft extensions 24, 26 journaled in bearings 28, 30. A windings portion 32 of the armature 22 includes conventionally arranged armature windings (not shown in detail) conventionally connected to segments or bars 34 of the commutator 36. Armature shaft extension 26 carries and drives an air circulating fan 38. The field case 16 is substantially closed by ventilated end cover 40 attached by screw fasteners 42.

The armature 22 is surrounded by a stator subassembly 44 rigidly supported within the field case 16. The stator subassembly 44 constitutes an important part of the invention and will be described in some detail below. For convenience its opposite ends will be referred to as commutator and fan ends 46, 48, respectively.

Figure 2:
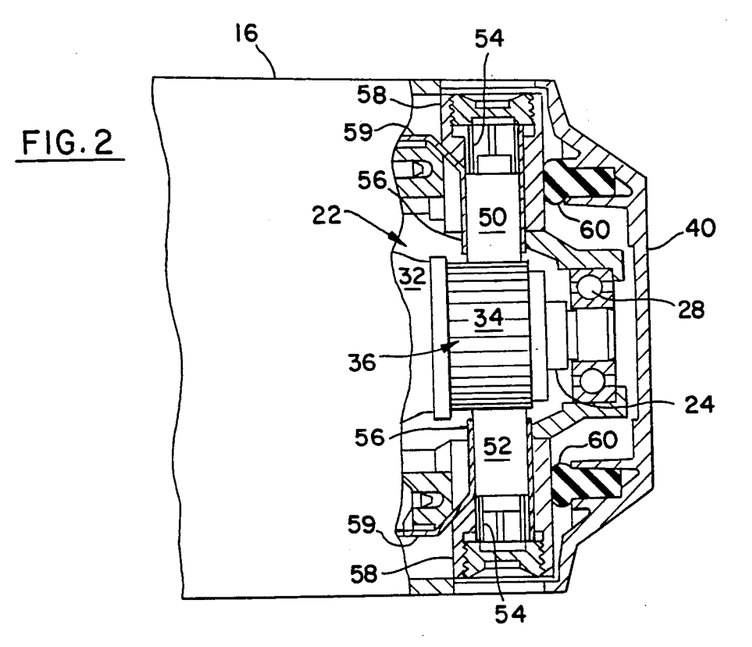
FIG. 2 is a partially broken-out and cross-sectional overhead view of the commutator end of the saw motor to a somewhat larger scale and taken approximately on line 2—2 of FIG. 1.

FIG. 2, taken on a horizontal plane through the motor axis, shows additional detail related to the commutator 36. A pair of diametrically opposed brushes 50, 52 each biased by a spring 54, ride on the segments 34 of the commutator 36. Each brush is free to slide radially in its brush holder 56 which in turn is carried by an insulated brush box or housing 58. Electrical connection (not shown in FIG. 2) is made from the brushes to the commutator end 46 of the stator subassembly by brush holder connector member 59. (A similar brush holder and housing arrangement is described in more detail in copending U.S. patent application, Ser. No. 07/351,996, now U.S. Pat. No. 4,963,779, Lentino et al., sharing a common assignee with the present invention). Resilient bolsters 60 help to maintain the axial position and electrical connection of the brush box and brushes relative to the commutator 36 and the commutator end 46 of the stator assembly.

Figure 3:
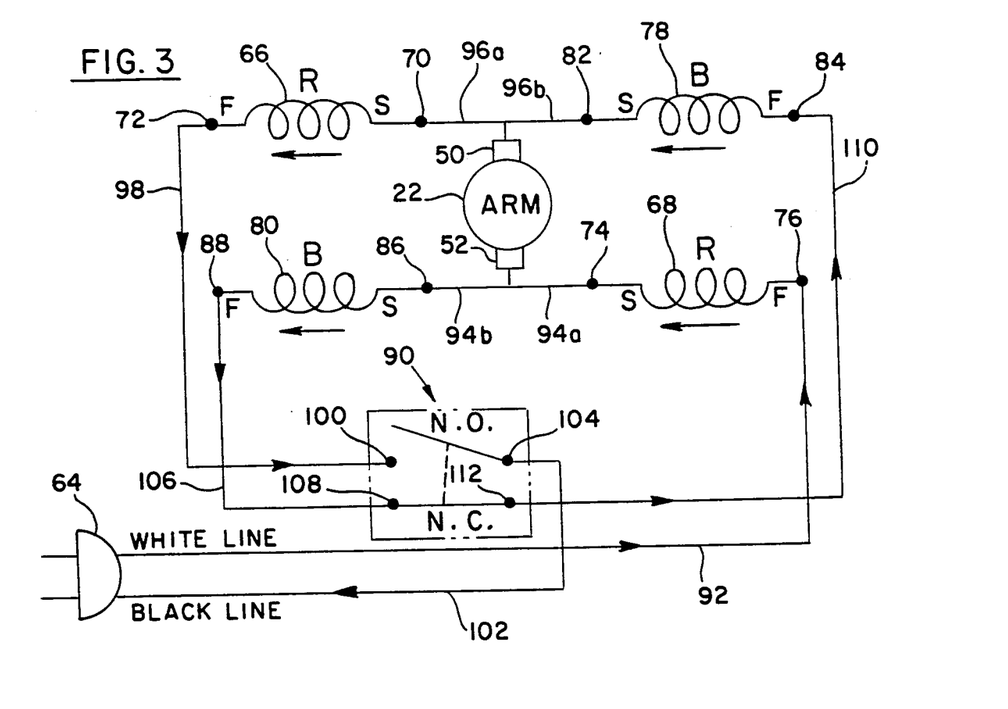
FIG. 3 is a wiring schematic for the motor and its power supply.

As indicated in the wiring schematic of FIG. 3, the saw motor is of the series wound-type, often called universal. Run field windings designated generally by the letter R in the drawings are connectable in series with the armature 22 and a conventional source of electrical power 64. In this embodiment the run winding is split into two portions connected electrically on opposite sides of the armature 22 and comprising first and second run windings 66, 68, respectively, and connected respectively to first and second sides of the armature represented by brushes 50, 52. Each run winding has first and second ends or terminations respectively: 70, 72 for the first run winding 66; and 74, 76 for the second run winding 68.

The motor also includes a secondary field winding, in this embodiment provided specifically for a dynamic braking function and designated generally (in FIG. 3) by the letter B. The brake winding B is connectable in shunt across the armature 22. In an arrangement similar to that of the run windings, the brake winding consists of first and second brake field windings 78, 80 connected respectively to the first and second sides of the armature 22 as represented by brushes 50, 52. Each brake field winding 78, 80 has first and second ends or terminations 82, 84 and 86, 88, respectively.

Switching between a run mode and braking mode for the motor may be accomplished by a suitable switching arrangement such as that provided by the switch 90 shown in FIG. 3. Functionally this consists of two single pole, single throw switches with alternate contact (one pole normally open, one pole normally closed). Motor connections are completed (schematically) by suitable conductors as follows: 92 from the power supply 64 to second run winding second termination 76; 94a and 94b respectively from second run and second brake winding first terminations 74, 86, respectively to the armature 22, second side 52; 96a and 96b from the armature first side 50 respectively to first run and first brake winding first terminations 70 and 82; 98 from the first run winding second termination 72 to switch contact 100; 102 from switch terminal 104 to power supply 64; 106 from switch contact 108 to second brake winding second termination 88; and 110 from first brake winding second termination 84 to switch terminal 112.

Figure 4:
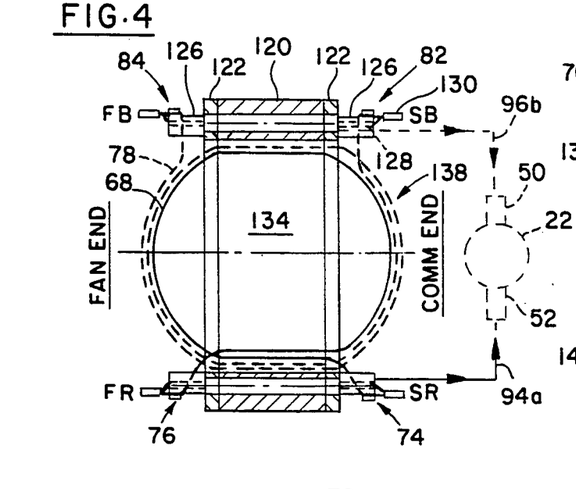
FIG. 4 is a semi-schematic cross sectional view of the stator subassembly of the motor taken approximately on line 4—4 of FIG. 5, covering a second pole of the motor and including a purely schematic representation of the commutator brush connections for the field windings associated with that pole.
Figure 5:
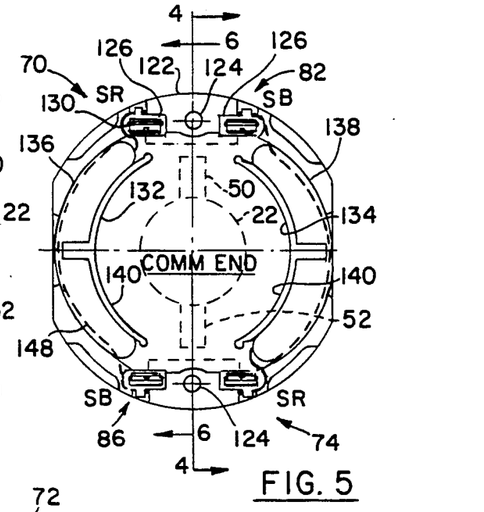
FIG. 5 is a semi-schematic left-hand end view (commutator end) of the stator subassembly, taken approximately on line 5—5 of FIG. 1.
Figure 6:
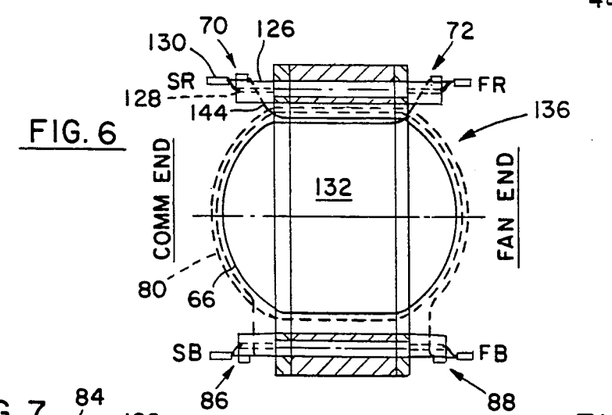
FIG. 6 is a view similar to FIG. 4, taken approximately on line 6—6 of FIG. 5 and covering the first pole of the motor.
Figure 7:
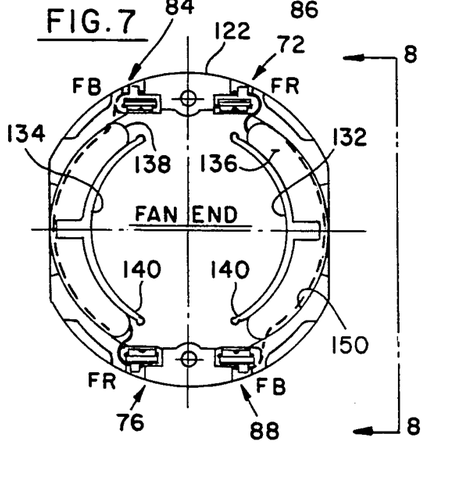
FIG. 7 is a view similar to FIG. 5 showing the right-hand or fan end of the stator assembly.

FIGS. 4–8 present in simplified form five views of a stator subassembly 44 suitable for use in the circular saw of FIGS. 1 and 2 and conforming to the wiring schematic of FIG. 3. The figures also show, graphically, configurations of the windings making up the field coils and also the direction of winding. FIG. 5 represents an end view of the commutator end 46 of the stator subassembly 44 taken approximately on line 5—5 of FIG. 1. However, for drafting and description convenience the view has been rotated 90° clockwise on the page. FIG. 7 has been similarly treated.

The two pole stator subassembly 44 is in many respects conventional. A laminated steel core 120 is contained between plastic end rings 122, the assembly being held together partly by elongated fasteners (not shown) passing through holes 124. From each end ring 122 two pairs of relatively closely spaced terminal posts 126 extend axially. Each post 126 has an axially extending socket 128 into which a conductive terminal 130 may be inserted. First and second pole pieces 132, 134 of the core 120 are conventional in shape and carry respectively first and second field coils 136, 138. Position and shape of coils is maintained in part by bolsters 140 extending from each opposite end of the pole pieces 132, 134.

Each field coil 136, 138 comprises a run winding and a brake winding, the first field coil 136 being made up of the first run winding 66 and the second brake winding 80, while the second field coil 138 includes second run winding 68 and first brake winding 78.

The individual windings of the field coils 136, 138 are each preferably terminated mechanically and in fixed positions on the stator so that they are machine locatable in a succeeding assembly operation. This may be achieved by a known method such as that disclosed in U.S. Pat. No. 3,725,707 Leimbach hereby incorporated by reference. All terminations in the present embodiment are similar and only one need be described—for example, the first end termination 70 of the first run winding 66 and included in FIG. 6. The end lead 144 of the field winding is crimped into terminal 130 which is inserted into terminal recess 128 of the post 126. A termination arrangement of this type is described in more detail in U.S. Pat. No. 4,613,781 Sanders, also hereby incorporated by reference.

In FIGS. 3-8 the start and finish ends of all windings have been indicated by the letters S and F respectively. And it will be seen that in this embodiment all windings are clockwise as seen by the armature (viewed from inside the stator subassembly). It will be seen also that the start end of each winding corresponds to what was designated as its first end or first termination above. Each winding termination is adjacent the axial physical end of the field coil carrying the winding. And all first ends are adjacent the commutator end 46 of the stator subassembly 44. The field coils 136, 138 are preferably machine wound in situ by a suitable method such as that disclosed in U.S. Pat. No. 4,612,702 Wheeler, hereby incorporated by reference.

Figure 8:
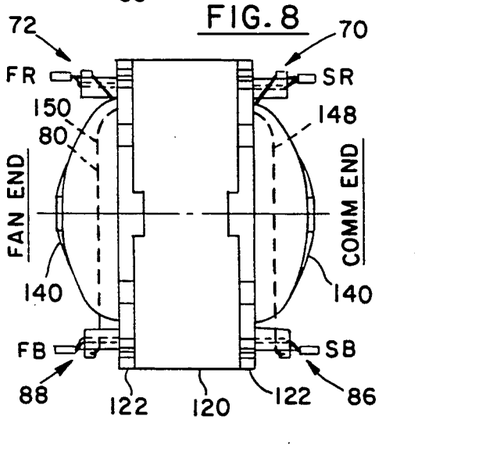
FIG. 8 is a semi-schematic external view of the stator subassembly as viewed approximately on line 8—8 on FIG. 7.

As may be seen in the drawings, particularly in FIG. 8, achievement of the particular wiring and winding configurations of the invention includes the use of crossover lead portions 148, 150 for the start and finish ends of the second brake winding 80 in the first field coil 136. These leads are pulled across the back of the coils to provide bonding to the main coil and additional support for the leads. The second field coil 138 is treated similarly.

A second embodiment, illustrated in FIGS. 9-12, is very similar to the first in many respects. For example, and in general terms, a two-pole series wound motor again has split windings with first run and brake windings and second run and brake windings electrically on first and second sides of an armature respectively. All field windings are wound in the same direction (clockwise) as seen by the armature. For description purposes, the physical ends and termination of all windings at the commutator end of the stator assembly are designated as first ends. However, this second embodiment differs from the first in that the first run and first brake windings are carried together on a first pole, whereas in the first embodiment the first pole carries the first run and second brake windings (corresponding differences, of course, apply to the respective second poles). Also in the second embodiment the brake windings are started at the fan end of the stator assembly whereas in the first embodiment all windings are started at the commutator end.

Figure 9:
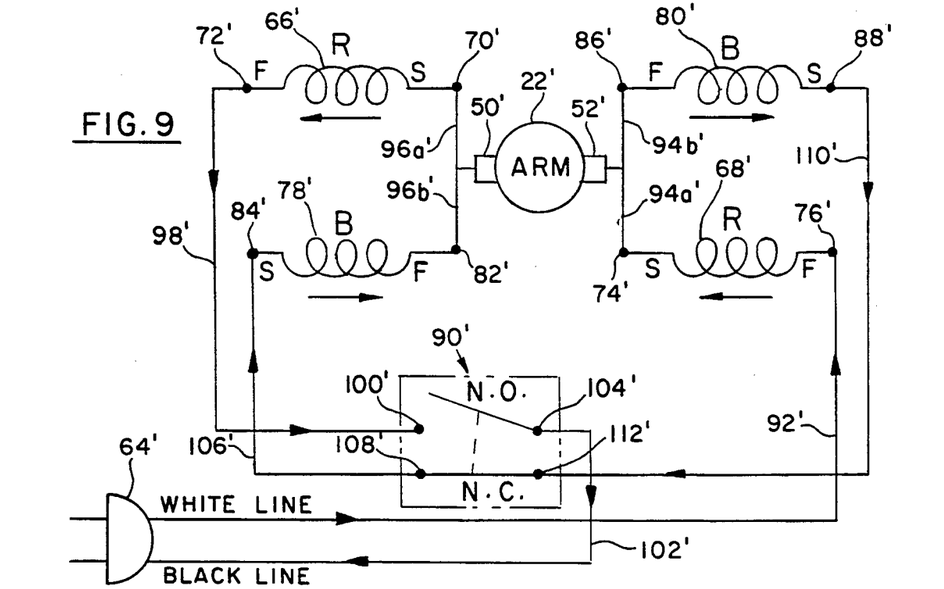
FIG. 9 is a view similar to FIG. 3 of a wiring schematic for the motor and power supply of a second embodiment of the invention.

Specifically, for the second embodiment, and referring first to FIG. 9—first and second run windings 66', 68' are series connected respectively to first and second sides of the armature 22' represented by brushes 50', 52'. Each run winding has first and second ends or terminations respectively: 70', 72' for the first run winding 66'; and 74', 76' for the second run winding 68'.

First and second brake field windings 78', 80' are series connected respectively to the first and second sides of the armature 22' as represented by brushes 50', 52'. Each brake field winding 78', 80' has first and second ends or terminations 82', 84' and 86', 88', respectively.

Again, a paired single pole single throw, alternate contact switch 90' may be used for switching between the run mode and braking mode. Motor connections are completed schematically by suitable conductors as follows: 92' from the power supply 64' to second run winding second termination 76'; 94a' and 94b' respectively from second run and second brake winding first terminations 74', 86', respectively to the armature 22', second side 52'; 96a' and 96b' from the armature first side 50', respectively to first run and first brake winding, first terminations 70' and 82'; 98' from the first run winding second termination 72' to switch contact 100'; 102' from switch terminal 104' to power supply 64'; 106' from switch contact 108' to first brake winding second termination 84'; and 110' from second brake winding second termination 88' to switch terminal 112'.

Figures 10, 11, 12:
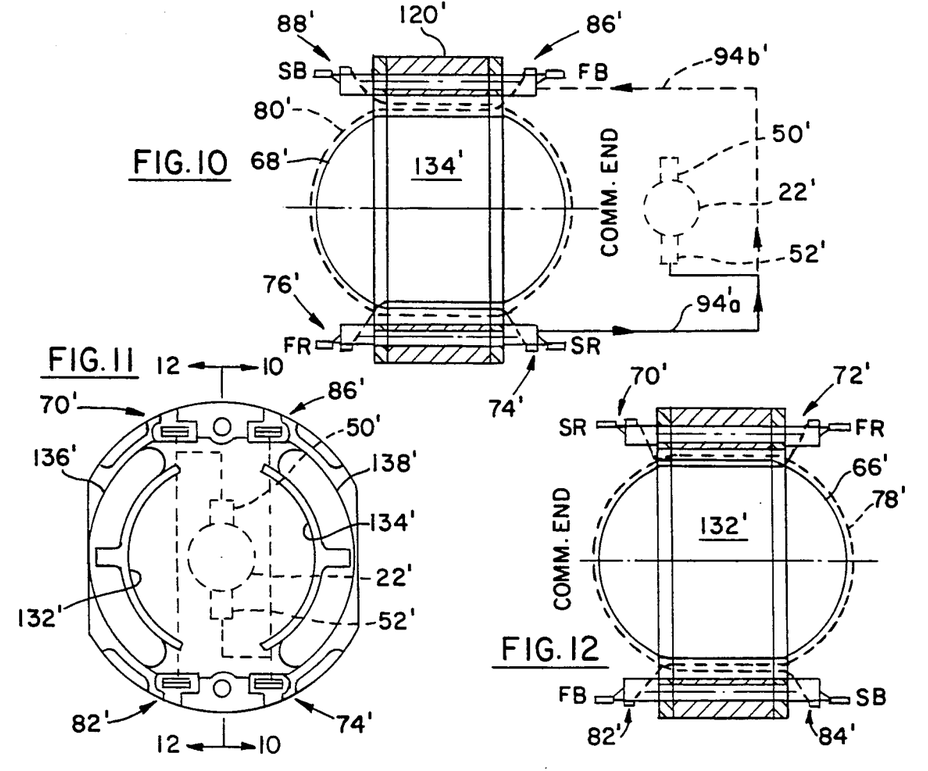
FIG. 10 is a view of the stator assembly of second embodiment similar to FIG. 4 and taken approximately on line 10—10 of FIG. 11.
FIG. 11 is a view of the second embodiment similar to FIG. 5 and viewed from the left-hand end or commutator end of the motor, approximately on line 11—11 of FIG. 1.
FIG. 12 is a view of the second embodiment similar to FIG. 6 and taken approximately on line 12—12 of FIG. 11.

For the second embodiment FIGS. 10-12, corresponding to FIGS. 4-6, present in simplified form a stator subassembly 44' conforming to the wiring schematic of FIG. 9. Again the figures show graphically configurations of the windings making up the field coils and also the directions of winding. FIG. 11, an end view of the commutator end of the stator subassembly 44', as with FIG. 5, has been rotated 90° clockwise on the page for drafting and description convenience.

The first and second pole pieces 132', 134' of the core 120' carry respectively, first and second field coils 136', 138'. Each field coil comprises a run winding and a brake winding, the first field coil 136' being made up of the first run and brake windings 66', 78' respectively, while the second field coil 138' includes the second run and brake windings 68', 80'.

For the second embodiment (FIGS. 9-12) the start and finish ends of all windings have again been indicated by the letters S and F, respectively. All windings are clockwise as seen by the armature and again all windings are double-ended, in that they start and finish at opposite ends of the coil, but in this embodiment the run and brake windings start at opposite ends of the coils, the run windings starting at the commutator end and the brake windings starting at the fan end. Each winding termination is adjacent the physical end of the coil carrying the winding. Again, all first ends of the windings are at the commutator end 46' of the stator subassembly 44'.

In the second embodiment and with particular reference to FIGS. 10 and 12, it may be seen that achievement of the particular wiring and winding configurations of the invention is made with "straight pulls" for the start and finish lead of all windings, compared with the first embodiment (see FIG. 8 particularly) which includes crossover leads for the start and finish of the brake windings.

In normal operation, behavior of a motor according to the invention is essentially conventional. In the present embodiments for example, manual actuation of the motor control switch 90, 90' (which is shown in FIGS. 3 and 9 in its normal off or braking position), opens the contacts 108, 108' and closes the contacts 100, 100', disconnecting the brake windings and energizing the field run windings and the armature windings so that the armature rotates in normal fashion driving the saw blade 14 at relatively high speed.

Upon release, the switch 90, 90' reverts to its normal condition in which the run windings and armature are disconnected from the source of electrical power 64, 64' and the brake windings 78, 80 and 78', 80' are connected in shunt across the armature 22, 22'. Switching the motor from the run to the off or braked condition creates a reversal of polarity effective between the field windings and the armature windings. In the presence of the residual magnetic field in the stator (from the run condition) regenerative direct current reversal is produced through the armature and field windings. This current flow is in the direction of reversing armature rotation and its effect is to slow and stop the armature. Rotation is stopped more quickly than if the tool was allowed to "coast" to a stop relying only on windage and friction.

That motor wiring and winding arrangements according to the present invention are operable to produce the necessary relative or effective reversal of field polarity for the dynamic braking function may be "tested", for example in the first embodiment by comparing in FIG. 4 the respective directions of current flow for the run and braking modes based on the arbitrarily assigned directions of current flow indicated by the arrows of FIG. 3. FIG. 4 represents the second pole 134 carrying the second field coil 138 consisting of the second run winding 68 and the first brake winding 78. The directions of current flow shown in FIG. 3 (from F to S in both windings) transpose and correspond to counterclockwise current flow in both windings when the motor is in the respective run and brake conditions. The corresponding respective reversal of current flow in the armature is indicated by the arrows on conductors 94a, 96b in FIG. 4. The same effective reversal would of course occur at the opposite first pole (132, FIG. 6) and need not be described in detail. In the second embodiment a similar examination of FIGS. 9 and 10 for the second pole of that embodiment also indicates that the necessary effective reversal of polarity between field and armature windings occurs. See the indicated current flow direction in conductors 94a', 94b' in FIG. 10.

A two-pole universal motor according to the invention, for small tool or appliance use, includes primary windings for the run function and, in the embodiments disclosed, an auxiliary or secondary winding specifically for a dynamic braking function. Advantages of having specific secondary windings are that they can be designed, for example, to provide a braking characteristic to suit a particular application and that, compared with systems that utilize reversal of polarity of run windings to provide dynamic braking, they are potentially lower in cost. And relatively lower currents generated in the braking mode potentially extend the life of components such as armature, commutator brushes, brush holders, wiring and switch.

The primary run and the secondary function (braking in the disclosed embodiments) are provided in a motor wiring and winding arrangement which facilitates automated manufacture and assembly and which provides good potential reliability. Reliability improvement potential derives in part from the benefits of controlled braking as described above and partly from the absence of jumpered internal connections of the motor or stator assembly, connections which by their nature have relatively short service lives.

An important aspect of the invention is the splitting of both run and brake windings with respect to the armature so that both field coils include a run and a brake winding. The arrangement lends itself itself to in situ machine winding of both windings on their respective pole pieces. On each pole piece, a run winding may be made first, with a brake winding wound on top of it, or vice versa. In keeping with the broader aspects of the invention, run and secondary windings may be made in either direction (clockwise or counterclockwise) but making all windings in the same direction (as seen by the armature) simplifies manufacture and is preferred.

Another important feature of the invention is its making use of double ended fields, comprised, by definition, of windings which start and finish adjacent axially opposite physical ends of the field coils of which they are a part. Dispersion of the start and finish leads in this way, at the respective opposite ends of the field coils, facilitates their mechanical termination at or adjacent fixed terminals. Fixed terminations are "machine locatable" and hence compatible with automated assembly. Limiting the number of terminals at each end of the stator assembly permits relatively wider spacing between them, providing more room for the tools of automated assembly, including automation of making the external connections to the terminals of the stator assembly. Dispersion of terminations to both ends of the stator assembly also eliminates the need for fishing or threading leads through or over the field.

The first embodiment (FIGS. 3-8), in which all windings start at the commutator end, provides for a particularly convenient disposition of terminations or terminals at the commutator end (See FIG. 5). There, each relatively closely spaced pair of terminations (70, 82, and 74, 86) is directly connectable by suitable means to its immediately adjacent respective brush (50, 52). As shown in the drawings this first embodiment does include the use of crossover leads 148, 150 in one of the pairs of windings (in this case the treatment is applied to the brake windings), but production of this configuration is also readily automated.

In the second embodiment, FIGS. 9-12, in which the run and brake windings start at respectively opposite ends of the field coils and in which a generally conventional stator layout is maintained (at least with regard to space available on the end rings 122 for terminations), "straight pulls" for all winding ends somewhat simplify winding manufacture. But the termination pairs (70', 82', and 74', 86'), connectable respectively to common brushes 50', 52' are more widely spaced (FIG. 11) involving, for one termination in each pair, reaching almost diametrically across the end of the field.

In both embodiments, as can be seen in the drawings, winding start and finish ends are accessible for mechanical termination to fixed termination points (four at each end of the stator) which may include axially oriented terminal members such as socket 128 in terminal post 126. The stator assembly 44 is thus prepared for efficiently automated assembly by presenting to it, in an axial direction, related motor or tool subassemblies for simultaneous completion of multiple connections of motor circuitry external to the stator assembly. At the commutator end 46 these are the brush connections and at the fan end 48 connections to the control switch 90, 90' and to the power supply 64, 64'.

As demonstrated by the exemplary embodiments described above, the invention, with negligible compromise, advantageously combines in a series wound motor the means for achieving both operational objectives, including normal running and an independently structured secondary function, and cost-reducing manufacturing objectives, including facilitation of automated assembly. Other embodiments, falling within the scope of the invention and intended to be embraced by the claims which follow, will suggest themselves to those of ordinary skill in the art.

We claim:

1. A universal electric motor having a longitudinally extending axis of rotation and comprising: an armature including a commutator and having, in terms of electrical connection, first and second sides:
   a stator subassembly;
   a first run field winding included in the stator subassembly and having first and second ends, the first end being connected to the first side of the armature;
   a second run field winding included in the stator subassembly and having first and second ends, the first end being connected to the second side of the armature, said first and second run windings respective second ends being connectable to a source of electrical power so that the run windings and armature are connected in series with the armature electrically between the windings;
   a first auxiliary field winding included in the stator subassembly and having first and second ends, the first end being connected to the first side of the armature;
   a second auxiliary field winding included in the stator subassembly and having first and second ends, the first end being connected to the second side of the armature; and
   switch means operable to disconnect the run windings from the source of electrical power and to connect the second ends of the respective first and second auxiliary windings together so as to change the mode of operation of the motor to an auxiliary mode.

2. The electric motor of claim 1 wherein each run and auxiliary winding comprises a continuous winding and the respective first and second ends include a start end and a finish end physically at longitudinally opposite ends of each winding.

3. The electric motor of claim 2 wherein each winding first end corresponds to the start end of the respective winding.

4. The electric motor of claim 2 wherein the stator subassembly has respective opposite commutator and fan ends, and wherein each winding is terminated at a fixed point adjacent one of said ends for facilitating mechanized external connections to the stator subassembly.

5. The electric motor of claim 1 wherein all field windings are wound in the same direction as seen by the armature.

6. The electric motor of claim 1 wherein the stator subassembly has first and second field poles and the first run and second auxiliary windings are associated with the first pole and the second run and first auxiliary windings are associated with the second pole.

7. The electric motor of claim 1 wherein the respective auxiliary windings are of equal size.

8. The electric motor of claim 2 wherein the first ends of the field windings correspond respectively to the start ends of the run windings and the finish ends of the auxiliary windings.

9. The electric motor of claim 8 wherein the stator subassembly has first and second poles and the first run and first auxiliary windings are associated with the first pole, and the second run and second auxiliary windings are associated with the second pole.

10. The electric motor of claim 1 wherein the first and second run windings are electrically equivalent and the first and second auxiliary windings are also electrically equivalent, and the electric motor is configured so that the stator subassembly is electrically symmetrical about all planes passing through the axis of rotation.

11. The electric motor of claim 1 wherein the stator subassembly has opposite commutator and fan ends and all the windings are configured so that all winding ends connectable to the commutator are adjacent the commutator end and all winding ends connectable externally of the motor for switching and power supply are adjacent the fan end.

12. The electric motor of claim 1 wherein the ends of all field windings include fixed terminations directly connectable with an external connecting element.

13. The electric motor of claim 12 wherein each winding termination includes an axially extending element for receiving a mating element presented in an axial direction.

14. The electric motor of claim 1 wherein the ends of all field windings include terminations and the respective field windings are so configured that all winding terminations are directly connectable externally of the stator subassembly.

15. The electric motor of claim 1 wherein the field windings include field winding terminations connectable with a switch and a source of electrical power, and wherein all said terminations are adjacent the same end of the stator subassembly, and directly connectable to said switch and source of electrical power.

16. The electric motor of claim 1 wherein the stator subassembly has opposite ends each end including a plurality of fixed terminal elements for connection externally of the stator subassembly, and wherein each field winding includes an end directly connected to one of the fixed terminal elements.

17. The electric motor of claim 16 wherein each stator subassembly end includes four terminal elements.

18. The electric motor of claim 1 wherein the switch means includes two single pole, single throw switch elements.

19. A universal motor having a longitudinally extending axis of rotation and comprising:
   an armature having, in terms of electrical connection, first and second sides;
   a stator subassembly;
   a first run field winding included in the stator subassembly and having first and second ends, the first end being connected to the first side of the armature;
   a second run field winding included in the stator subassembly and having first and second ends, the first end being connected to the second side of the armature, said first and second run windings respective second ends being connectable to a source of electrical power so that the run windings and armature are connected in series with the armature electrically between the windings;

a first brake field winding included in the stator subassembly and having first and second ends, the first end being connected to the first side of the armature;

a second brake field winding included in the stator subassembly and having first and second ends, the first end being connected to the second side of the armature; and switch means operable to disconnect the run windings from the source of electrical power and to connect the second ends of the respective first and second brake windings together, said brake windings being wired and wound so as to, in operation, generate a force opposing continued rotation of the armature when so connected.

20. A universal motor having an auxiliary mode of operation, for use in small tools and appliances, comprising:

an armature; and a stator subassembly having opposite ends and a plurality of double-ended field windings, including a pair of run windings connectable to a source of electrical power, and a pair of auxiliary windings for providing the auxiliary mode of operation, each winding having axially spaced respective start and finish ends, wherein the motor is a two pole motor having two poles and one each of the respective run and auxiliary windings are associated with each of the poles, and wherein the armature is connectable in series with both the run and the auxiliary windings and electrically between the members of each pair of windings, and the windings include a plurality of winding terminations disposed adjacent each opposite end of the stator subassembly, said terminations being directly connectable externally of the stator subassembly for establishing motor operability without the use of internal connections between the field windings or jumpered connections on the stator subassembly.

21. The motor of claim 20 wherein the windings are machine wound in situ.

22. The motor of claim 21 wherein the windings are mechanically terminated.

23. The motor of claim 21 wherein the windings are all wound in the same direction as seen by the armature.

24. The motor of claim 20 wherein each winding includes a termination and each termination includes a straight pull with respect to the completed winding.

25. The motor of claim 20 wherein each winding includes a termination and each termination of one of the pairs of windings includes a crossover lead.

26. The motor of claim 20 wherein the auxiliary windings are wired and wound so as to generate electromagnetic resistance to rotation of the armature when electrical power is disconnected from the run windings.

27. The motor of claim 20 wherein each winding includes a pair of terminations and all terminations are, for motor operation, connectable only externally of the stator subassembly.

28. The motor of claim 20 wherein the plurality of winding terminations includes four terminations at each end of the stator subassembly.

29. A universal motor having an auxiliary mode of operation, for use in small tools and appliances, comprising:

an armature;

a stator subassembly having opposite ends and a plurality of double-ended field windings, said windings each having axially spaced respective start and finish ends and being wound in situ and mechanically terminated wherein some of the windings are auxiliary windings; and switch means operable to connect the auxiliary windings so that the motor is operable in the auxiliary mode, wherein the winding start and finish ends include a plurality of winding terminations disposed adjacent each opposite end of the stator subassembly, said terminations being directly connectable externally of the stator subassembly, and the field windings are wired and wound so that said direct connectability facilitates the establishment of a predetermined motor function without the use of internal connections within the field windings or jumpered connections on the stator subassembly.

30. A universal motor having an auxiliary mode of operation, for use in small tools and appliances, comprising:

an armature;

a stator subassembly having opposite ends and a field including respective pairs of run field windings and auxiliary field windings, each pair of windings being connectable in series with the armature so that, for each pair, the armature is electrically between the two windings of the pair; and switch means selectively operable to complete connection of the run field windings to a source of electrical power for a run mode and to connect the auxiliary field windings in shunt across the armature for the auxiliary mode of operation, wherein each field winding has first and second ends and the field windings are so wired and wound and disposed that a plurality of winding ends is presented adjacent each opposite end of the stator subassembly and so that the run and auxiliary modes of operation may be predetermined by direct connection of the respective ends of the windings, as wound, to the armature and switch means without the use of internal connections between the field windings or jumpered connections on the stator subassembly.

31. The motor of claim 30 wherein all field winding first ends are connectable to the armature and all said ends are disposed adjacent the same opposite ends of the stator subassembly.

* * * * *